PHILLIPS & BRIGGS.
Improvement in Fruit Gatherers.
No. 124,384.             Patented March 5, 1872.
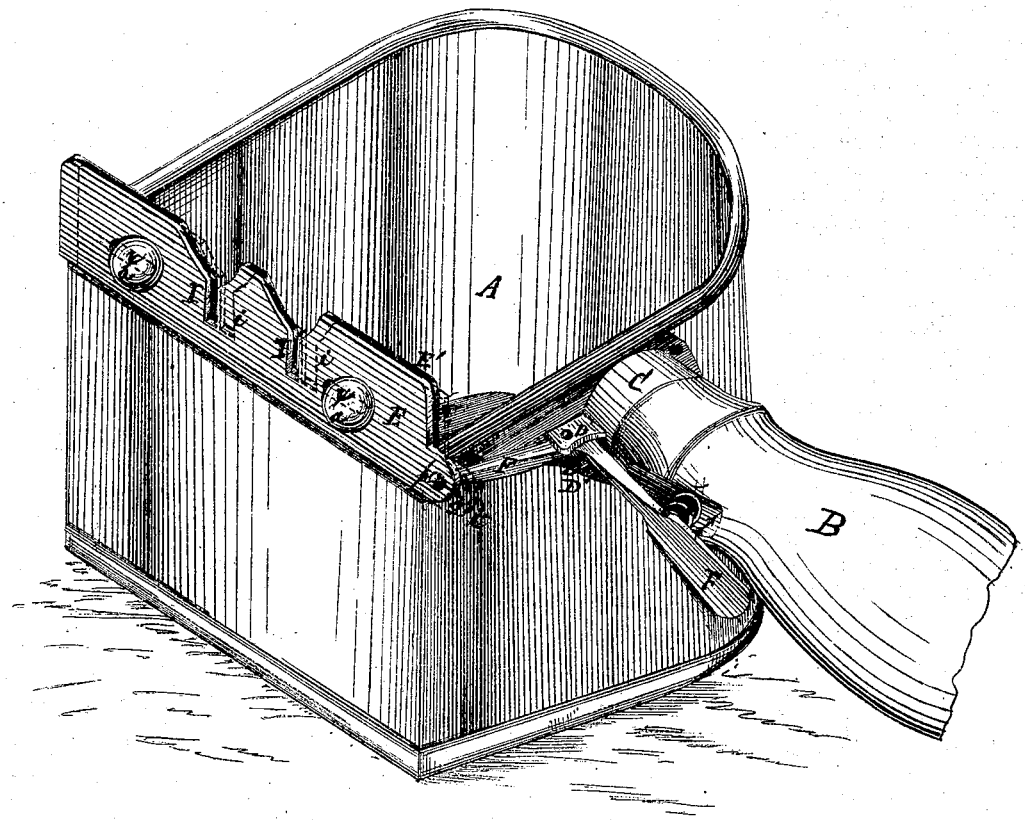
WITNESSES
William W. Pickard
Alfred Pickard
INVENTOR
Charles H. Phillips
Daniel F. Briggs

124,384

UNITED STATES PATENT OFFICE.

CHARLES H. PHILLIPS AND DANIEL F. BRIGGS, OF PROVIDENCE, R. I.

IMPROVEMENT IN FRUIT-GATHERERS.

Specification forming part of Letters Patent No. 124,384, dated March 5, 1872.

*To all whom it may concern:*

Be it known that we, CHARLES H. PHILLIPS and DANIEL F. BRIGGS, both of the city and county of Providence, in the State of Rhode Island, have invented a new and useful Improvement in "Berry-Pickers," for picking strawberries and other like fruit; and we do hereby declare that the following specification, taken in connection with the drawing making a part of the same, is a full, clear, and exact description thereof.

Our invention is an arrangement for facilitating the picking of berries, making a saving of time and labor, and doing away entirely with the now tedious process of handling every berry. Strawberries require picking when quite ripe, and unless great care is used, are liable to be entirely spoiled for market. Our invention is so constructed that it can be placed under the vines, cut the stems close to the berries, when they will fall into the cups, from which they may be transferred to boxes without being crushed or bruised.

Referring to the drawing, our invention is represented in perspective.

A is a cup, made of ordinary tin or other metal, with a curved back, and bottom beveled from the back to the front, thus more easily bringing the cup under the vines for gathering the fruit. B is the handle. C is the ferrule at the end of the handle, and with it fastened to the cup by rivets. E is a sliding blade, made of steel or other hard substance, guided and held by two pins, $a'$ $a'$, passing through the two slots $x$ $x$ in the sliding blade E, and securely fastened to the stationary blade E'. This stationary blade E' is of like material as sliding blade E, and is firmly secured to the upper rim of the front of the cup, the two together forming a sliding shears. I I are grooves, cut in the sliding blade E and the stationary blade E', and directly opposite each other. F is a lever, attached to the cup by a pin passing through the plates D and D', projecting from and forming part of the ferrule C. H is a small wire spring, inserted between the back of the lever and the handle B, for the purpose of keeping the lever in its proper place. The other end of the lever F projects through and is fastened to the end of the sliding blade or shear E, at the point $p$.

The operation is as follows: Placing the handle of the cup in the hand, the forefinger on the lever, with a slight pressure the lever is brought toward the handle and the sliding blade or knife E is drawn the length of the slots $x$ $x$ in the direction of the arrow $s$ to the dotted line $t$, and the grooves I I in the sliding blade E are brought to the dotted line $i$, passing entirely by the grooves I I in the stationary blade E'. The stem of the berry placed in the grooves is thus cut from the vine, and the berry falls into the cup without being handled.

What we claim as our invention, and desire to secure by Letters Patent, is—

The shears or knives E and E', attached to cup substantially as set forth and for the purposes specified.

CHARLES H. PHILLIPS.
DANIEL F. BRIGGS.

Witnesses:
WILLIAM W. RICKARD,
ALFRED RICKARD.